United States Patent [19]

Lewallen

[11] Patent Number: 5,011,208
[45] Date of Patent: Apr. 30, 1991

[54] CONCEALED INTEGRATED SEAT CARGO SCREEN

[75] Inventor: Sandra Lewallen, Rochester Hills, Mich.

[73] Assignee: General Motors Corporation, Detroit, Mich.

[21] Appl. No.: 488,818

[22] Filed: Feb. 23, 1990

[51] Int. Cl.$^5$ .............................................. B60R 5/04
[52] U.S. Cl. .................................. 296/37.16; 296/76
[58] Field of Search ....................... 296/37.16, 76, 37.1

[56] References Cited

U.S. PATENT DOCUMENTS

| | | | |
|---|---|---|---|
| 3,909,060 | 9/1975 | Katayama | 296/37 |
| 4,168,094 | 9/1979 | Yagi | 296/37.16 |
| 4,202,577 | 5/1980 | Breitschwerdt et al. | 296/24 |
| 4,222,601 | 9/1980 | White et al. | 296/37.16 |
| 4,289,345 | 9/1981 | Tamamushi et al. | 296/37.16 |
| 4,363,510 | 12/1982 | Burst et al. | 296/37.16 |
| 4,671,557 | 6/1987 | Lemp | 296/37.16 |
| 4,728,141 | 3/1988 | Motozawa et al. | 296/37.16 |
| 4,776,625 | 10/1988 | Lobanoff et al. | 296/37.16 |

FOREIGN PATENT DOCUMENTS 75034 4/1986 Japan .

*Primary Examiner*—Robert R. Song
*Attorney, Agent, or Firm*—Raymond I. Bruttomesso, Jr.

[57] ABSTRACT

An improved cargo screen for a vehicle body having a cargo floor accessible through a rear door and a rear seat which has a seat back that folds to extend the cargo floor. A cargo screen for covering the cargo floor includes a flexible screen having a forward end and a rearward end. The forward end of the flexible screen is mounted to the vehicle body below the cargo floor level on a reel having a spring for reeling the flexible screen to a stored position. A track formed on the seat back of the rear seat guides the flexible screen from the reel to the top edge of the seat back. A guide formed by the upper part of the the track redirects the flexible screen from a direction parallel to the folding seat back to a direction towards the rear door. The rearward end of the flexible screen is removably attachable to the vehicle body aft of the rear seat so that the screen is suspended above the cargo floor to conceal the cargo floor and the reel is concealed beneath the cargo floor. When detached, the cargo screen is retracted with the flexible screen stored on the cylindrical reel concealed below the level of the cargo floor and in the track.

4 Claims, 2 Drawing Sheets

CONCEALED INTEGRATED SEAT CARGO SCREEN

The invention relates to a cargo screen cover and more particularly provides a cover having a flexible sheet material which is stored on a reel located below the cargo floor level so that the cargo screen and reel do not obstruct the use of the cargo area.

BACKGROUND OF THE INVENTION

It is known in motor vehicles to provide a cargo area located in the passenger compartment immediately behind the rear seat. A rear hatch or rear cargo door grants access to this cargo area It is also know to have the seat back of the rear seat fold forward to increase the size of the cargo floor The cargo area may be covered by a cargo screen suspended above the cargo floor to conceal from sight the contents of the cargo area.

The cargo screen may be a panel of rigid material or a flexible sheet material retractably mounted to a reel. The cargo screen may be mounted on the rear seat, the rear door or the side walls of the cargo area. A disadvantage of the cargo screen is that the presence of the cargo screen within the vehicle occupies considerable space and can interfere with the use of the cargo area, especially when the rear seat is folded down and a large item is placed in the cargo area. Accordingly the prior art has provided cargo screen assemblies in which the entire cargo screen may be removed from the vehicle.

It would be desirable to provide a cargo screen which can be used when the rear seat is folded down and does not obstruct or diminish the cargo space. Additionally, it would be desirable to provide a cargo screen which stores in a manner that does not require removal in order not to obstruct or diminish the cargo space.

SUMMARY OF THE INVENTION

This invention provides an improved cargo screen for a vehicle body having a cargo floor accessible through a rear door and a rear seat which has a seat back that folds to extend the cargo floor. A cargo screen for covering the cargo floor includes a flexible screen having a forward end and a rearward end. The forward end of the flexible screen is mounted to the vehicle body below the cargo floor level on a reel having a spring for reeling the flexible screen to a stored position. A track formed on the seat back of the rear seat guides the flexible screen from the reel to the top edge of the seat back. A guide formed by the upper part of the track redirects the flexible screen from a direction parallel to the folding seat back to a direction towards the rear door. The rearward end of the flexible screen is removably attachable to the vehicle body aft of the rear seat so that the screen is suspended above the cargo floor to conceal the cargo floor and the reel is concealed beneath the cargo floor. When detached, the cargo screen is retracted with the flexible screen stored on the cylindrical reel concealed below the level of the cargo floor and in the track.

One object, feature and advantage of the invention is a back plate which is mounted on the seat back in spaced relation from the rear seat to form a track to guide the flexible screen and additionally serves as an additional cargo floor when the rear seat is folded down.

Another object, feature and advantage of the invention resides in the location of the cylindrical reel below the cargo floor thereby preventing the reel from obstructing or diminishing the cargo area.

Further objects, features and advantages of the present invention will become more apparent to those skilled in the art as the nature of the invention is better understood from the accompanying drawings and detailed description.

DESCRIPTION OF THE PREFERRED EMBODIMENT

Figure 1:
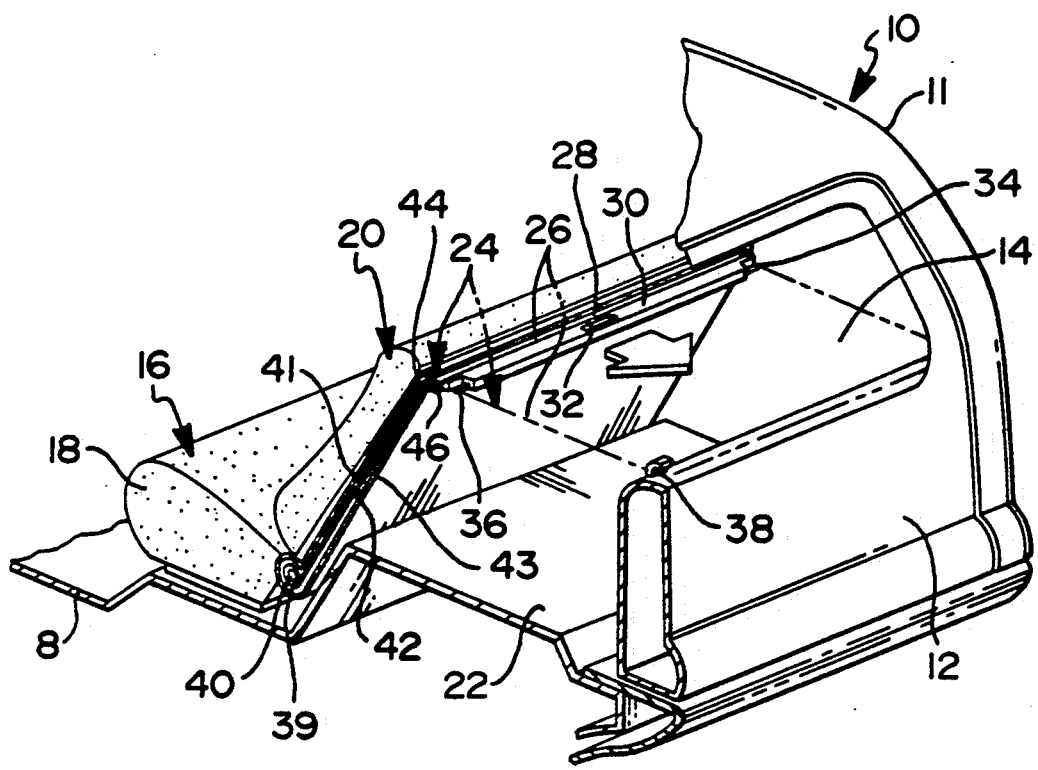
FIG. 1 is a perspective view having parts broken away and in section of the cargo screen in the stored position.
Figure 3:
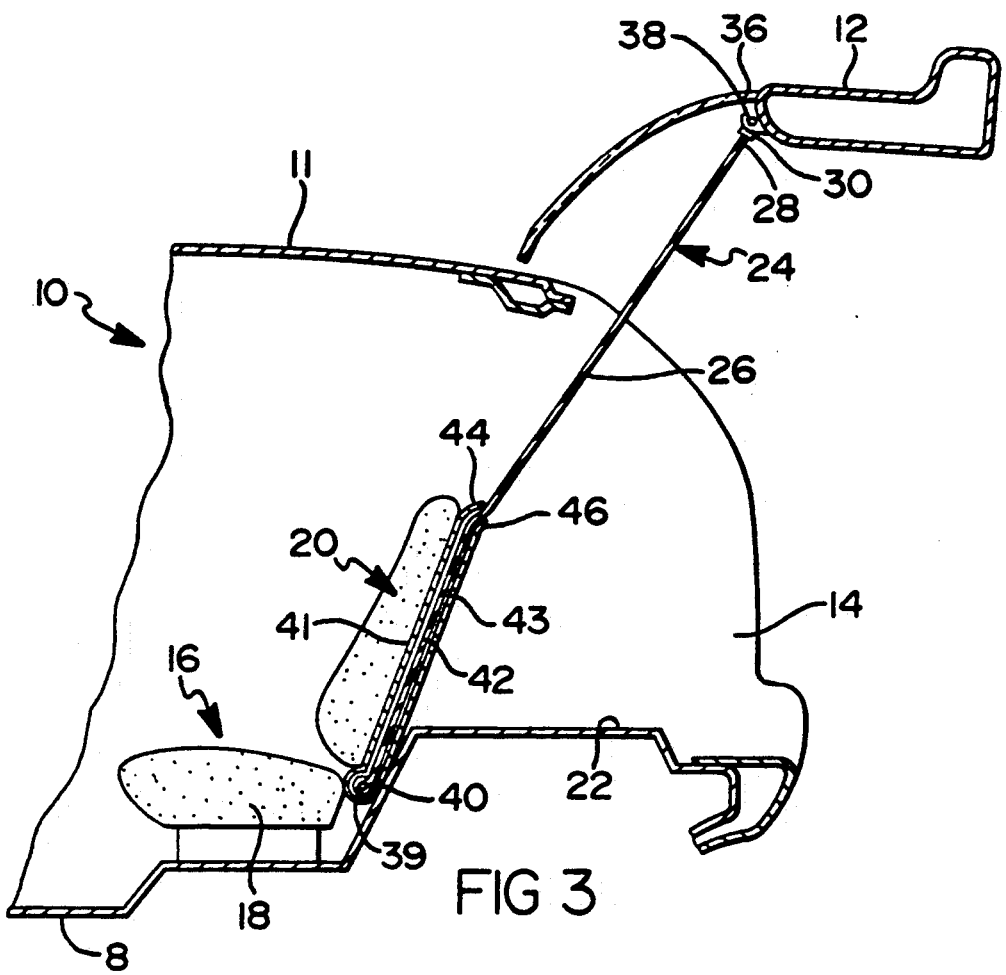
FIG. 3 is a side sectional view showing the cargo screen attached to a rear door which is in the open position.
Figure 4:
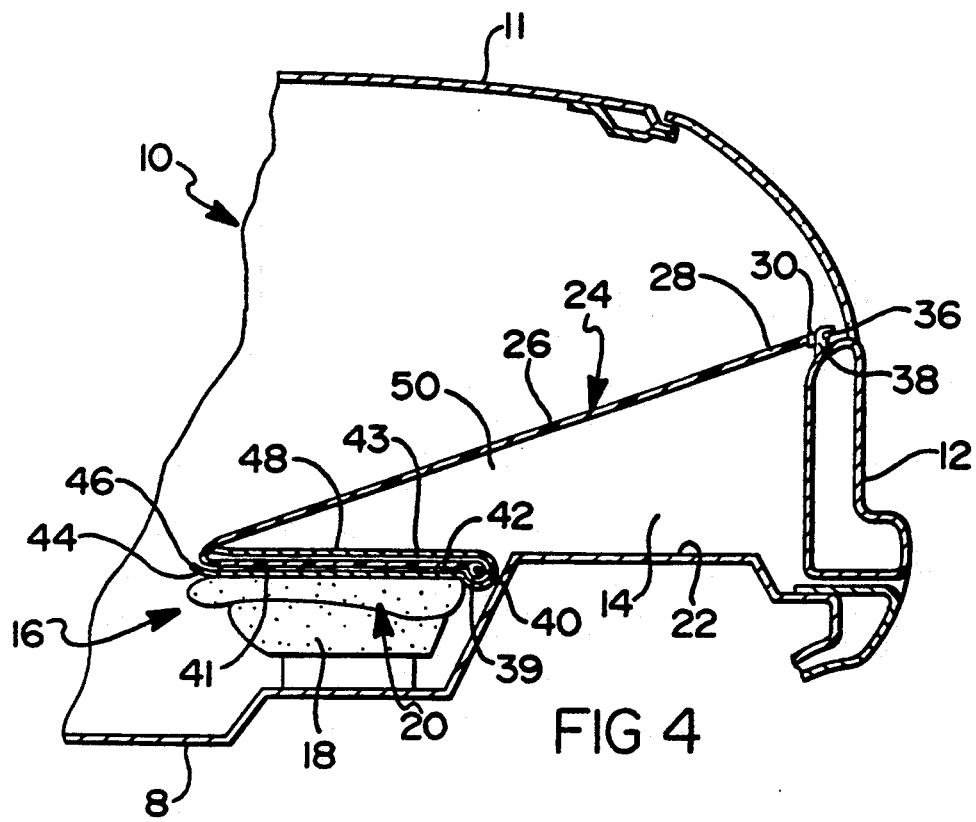
FIG. 4 is a side sectional view showing the cargo screen attached to the rear door with the rear seat back folded forward.

A motor vehicle 10 has a vehicle floor 8 and a roof 11 as shown in FIG. 1. The motor vehicle 10 has a rear seat 16 with a seat bottom cushion 18 and a folding seat back 20 pivotally attached to the seat bottom cushion 18 or the floor 8 to fold down forward to a substantially horizontal position as shown in FIG. 4 from a substantially vertical position as shown in FIG. 1. The motor vehicle 10 also has a rear hatch, or rear door 12 located at the rear and hinged to open upward for movement between the closed position of FIG. 1 and the open position of FIG. 3. A cargo floor 22 is located between the rear seat 16 and the rear door 12, and defines a cargo area 14.

Figure 2:
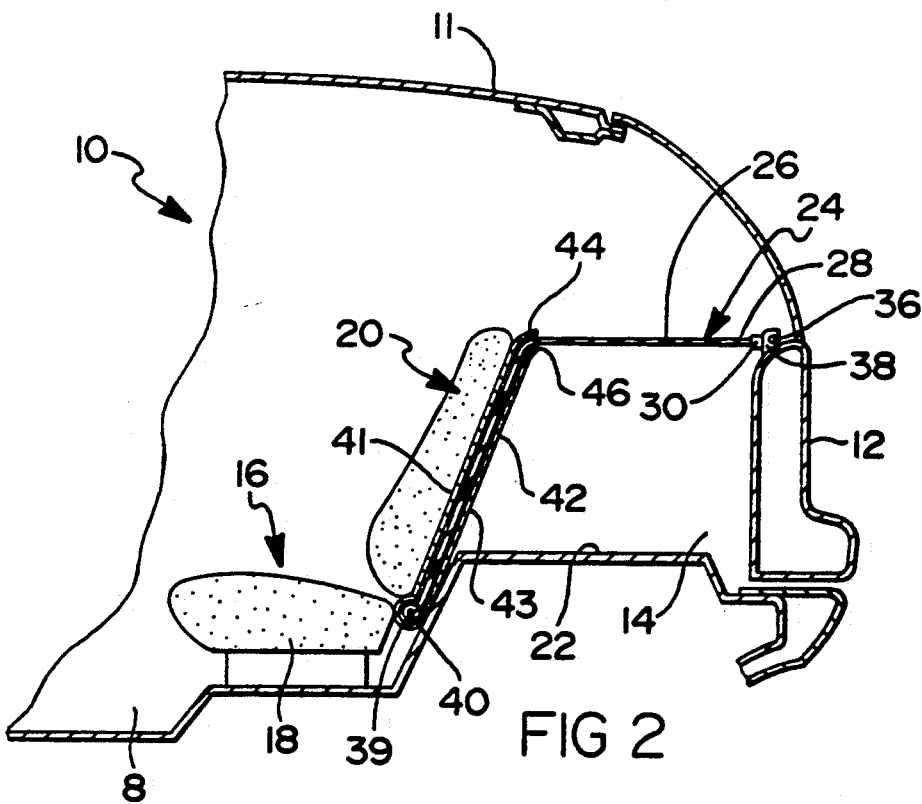
FIG. 2 is a side sectional view showing the cargo screen attached to the rear door.

A cargo screen 24 having a flexible sheet material 26 with a rearward end 28 covers the cargo area 14. A plastic member 30 attaches to the rearward end 28 of the flexible sheet material 26. The plastic member 30 has a handle 32 formed in the center and a pair of pins 34 and 36 located at the ends. The pins 34 and 36 engage a pair of retainers 38, only one shown, mounted on the rear door 12 as seen in FIGS. 2, 3 and 4. The pins 34 and 36 can be disengaged from the retainers 38 as shown in FIG. 1.

The flexible screen material 26 has a forward end 39 which is permanently affixed to a cylindrical reel 40 located aft of the rear seat 16 and below the level of the cargo floor 22 as seen in FIGS. 1-4. The cylindrical reel 40 is mounted on the folding seat back 20 by a pair of brackets not shown. Alternatively, the brackets may mount the cylindrical reel 40 on the floor 8. The cylindrical reel 40 has a spring, not shown, which maintains rotational tension and also retracts the flexible screen material 26 when the rearward end 28 is detached from the retainers 38.

A back plate 43 made of metal or plastic is mounted by brackets, not shown, a spaced relation from a back cover 41 of the folding seat back 20. When the folding seat back 20 is folded down to a substantial horizontal position, the back plate 43 forms an additional cargo floor 48 which is an extension of the cargo floor 22. A track 42 to guide the flexible screen material 26 from the cylindrical reel 40 to the upper edge of the folding seat back 20 is formed between the back cover 41 and the back plate 43.

The upper portion of the back cover 41 and the back plate 43 curve at the upper end of the folding seat back 20 to form a guide 44 to redirect the flexible sheet material 26 from a direction parallel to the folding seat back 20 to a direction towards the rear door 12 and the retainers 38. The width of the track 42 is narrow enough at the guide 44 to form a lip 46 to prevent the plastic member 30 of the cargo screen 24 from being retracted into the track 42.

FIG. 1 shows the folding seat back 20 substantial vertical and the rear door 12 closed. The cargo screen 24 is retracted with the flexible screen material 26 stored on the cylindrical reel 40 concealed below the level of the cargo floor 22 and in the track 42 concealed behind the back plate 43. The plastic member 30 with the handle 32 protrudes slightly from the lip 46 of the track 42 to remain accessible to the user. The cargo area 14 is open and not obstructed or diminished by the cargo screen 24 or cylindrical reel 40. The rear door 12 can be opened for free access to the cargo area 14.

FIG. 2 shows the folding seat back 20 substantial vertical and the rear door 12 closed. The cargo screen 24 covers the cargo area 14 and cargo floor 22 with the pins 34 and 36 engaging the retainers 38. The spring of the cylindrical reel 40 maintains the flexible sheet material 26 in a taut condition.

The rear door 12 can be opened without removal of the cargo screen 24 from the rear door 12 as shown in FIG. 3 to grant access to the cargo area 14. The cylindrical reel 40 lets out just enough of the flexible sheet material 26 to allow the rear door 12 to open and at the same time prevents the cargo screen 24 from drooping.

FIG. 4 shows the folding seat back 20 of the rear seat 16 folded down forward moving the back plate 43 from a relatively vertical position to a relatively horizontal position. The back plate 43 becomes the additional cargo floor 48 and defines an additional cargo area 50. The cylindrical reel 40 is located below the cargo floor 22 level and therefore does not obstruct or diminish the use of the cargo areas 14 and 50. The flexible sheet material 26 follows the track 42 to the guide 44 where it is redirected towards the rear door 12 and the retainer 38 as shown in FIG. 4. It is desirable that the flexible sheet material 26 be of sufficient length that it can conform to cargo in the cargo areas 14 and 50, if it is not possible for the cargo screen 24 to go directly from the guide 44 to the retainers 38. The cargo screen can also be detached from retainers 38 on the rear door 12, in which case the cargo screen 24 is retracted with the flexible screen material 26 stored on the cylindrical reel 40 concealed below the level of the cargo floor 22 and in the track 42 concealed below the back plate 43. Thus, the cargo screen 24 and the cylindrical reel 40 are protected from damage by the cargo.

While one embodiment of the present invention has been explained, various modifications within the spirit and scope of the following claims will be readily apparent to those skilled in the art. For example, the cargo screen could also be attached to a retainer mounted on the side walls of the cargo area. Alternatively, in cases where the rear door does not extend down to the cargo floor the screen could be attached just below the rear door.

I claim:

1. In a vehicle body having a cargo floor accessible through a vehicle body door and a rear seat having a seat back that folds forwardly to extend the cargo floor, a cargo screen for covering the cargo floor comprising;
    a flexible screen having a forward and rearward end;
    means for removably attaching the rearward end of the flexible screen to the vehicle body aft of the rear seat;
    a reel means mounted on the vehicle body below the cargo floor level for mounting the forward end of the flexible screen; and
    guide means mounted on the seat back of the rear seat above the cargo floor for guiding the flexible screen from the reel means towards the means for removably attaching whereby the reel means is concealed beneath the cargo floor and the screen is suspended above the cargo floor to conceal the cargo floor.

2. A cargo screen as in claim 1, wherein the reel means for reeling the flexible screen is mounted on the lower edge of the seat back of the rear seat below the cargo floor.

3. A cargo screen as in claim 1, wherein the rearward end of the flexible screen has a pair of pins for mounting to the rear wall of the vehicle and an enlarged portion to prevent the rearward end from being retracted beyond the guide means for guiding the flexible screen.

4. A cargo screen as in claim 1, wherein the guide means for guiding the flexible screen is a back plate mounted a spaced relation from the folding seat back to form a track and a guide to guide the flexible screen material from the cylindrical reel towards the means for removably attaching the rearward end of the flexible screen to the vehicle body aft of the rear seat and defines an additional cargo floor when the folding seat back is folded down to a substantial horizontal position.

* * * * *